Nov. 10, 1964   B. BARKER   3,156,215
MOBILE HOPPER POULTRY FEEDER
Filed July 15, 1963   5 Sheets-Sheet 3

Inventor
Bernard Arthur Barker
By Lucke & Lucke

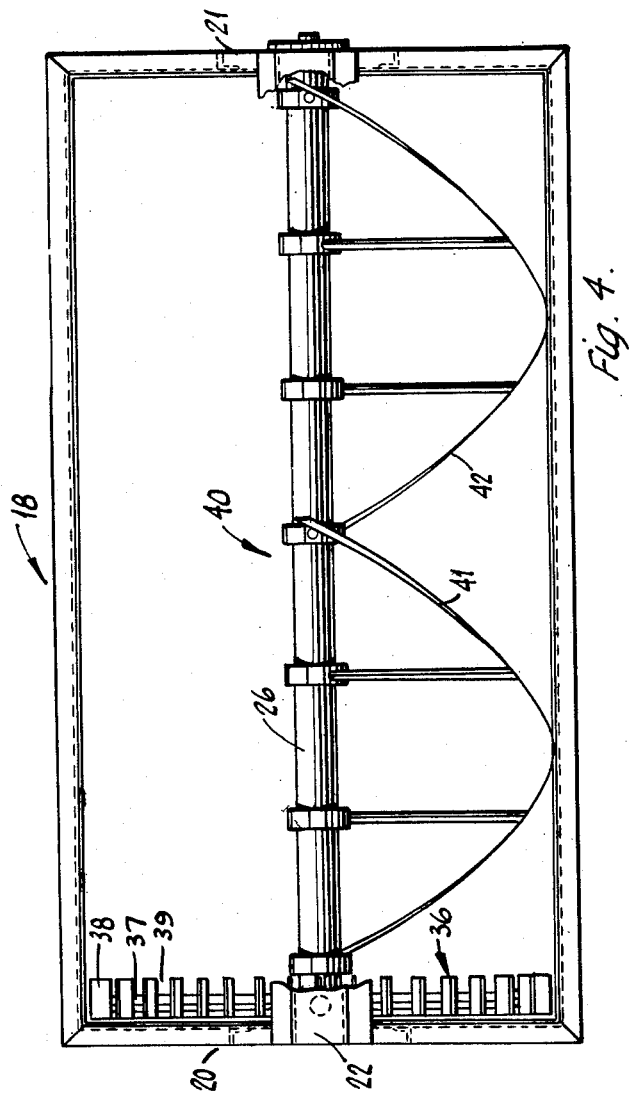

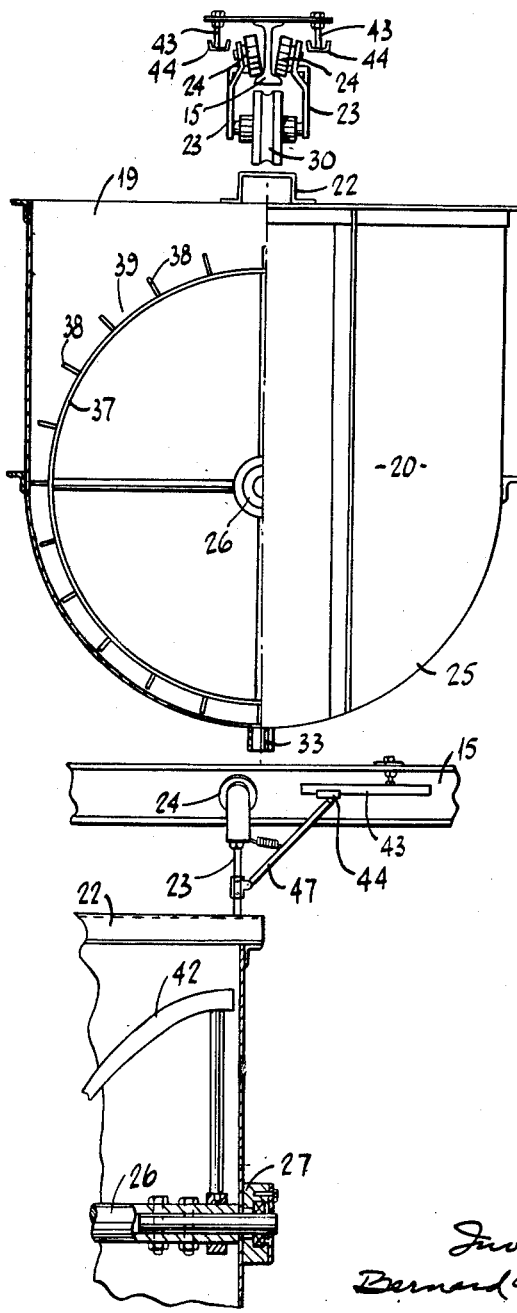

United States Patent Office 3,156,215
Patented Nov. 10, 1964

3,156,215
MOBILE HOPPER POULTRY FEEDER
Bernard Barker, Blackheath, near Birmingham, England, assignor to Fisher & Ludlow Limited, Stafford County, England, a British company
Filed July 15, 1963, Ser. No. 294,836
Claims priority, application Great Britain, July 19, 1962, 27,383/62
4 Claims. (Cl. 119—52)

This invention relates to a new or improved method of and apparatus for dispensing foodstuffs to poultry and other animals, e.g. growing calves.

At present the usual method of automatically dispensing foodstuffs to poultry as well as in some cases to larger animals such as cattle, is to provide a stationary container adapted continuously and in some cases intermittently to feed foodstuffs, for example poultry meal to a continuously or intermittently advancing foodstuffs conveyor which serves to advance and distribute the foodstuffs to the various desired positions in the poultry house or other building, in which the animals to be fed are housed.

For example, in a common arrangement the conveyor comprises one or more endless scraper-type chains adapted to advance the foodstuff along a trough through the open mouth of which the poultry or other animals feed.

Such an arrangement is open to the objection that the type of foodstuff which is being fed commonly and especially in the case of poultry comprises a mixture formed by compounding together a number of separate ingredients, and it is found that there is a marked tendency for the stronger or more aggressive birds or other animals among the quantity of birds or other animals to be fed, to station themselves near the position at which the food is fed on to the advancing conveyor chain and pick out from the compounded foodstuffs, particular preferred ingredients which may accordingly be missing from or be in an undesirably low proportion in that mass of foodstuffs which reaches other less aggressive and less strong birds or other animals, so that the latter do not receive the intended properly balanced diet, and their rate of growth is retarded as compared with that of the other birds or other animals.

Thus, a different rate of growth cycle is developed with the one batch of birds or other animals which first receive an undue proportion of certain more palatable ingredients continuing to imbibe this both during their growing life as well as when they are fully mature, growing as a result at the expense of the remaining birds or other animals to be fed. Such more rapidly growing animals become progressively stronger or more aggressive in relation to the less rapidly growing animals, so that the aforementioned objectionable result which is obtained by the existing method above described is cumulative.

The present invention seeks to obviate the disadvantage of the foregoing arrangement.

According to the present invention, we provide a method of dispensing foodstuffs to animals, comprising providing a foodstuff receiving support adapted to permit of a plurality of animals feeding simultaneously therefrom, providing a power operated foodstuffs distributing means, power advancing the distributing means in relation to the foodstuff receiving support and discharging foodstuff from said distributing means successively to different portions of the foodstuff receiving support.

Also, according to this invention, we provide apparatus for dispensing foodstuff for animal consumption, comprising a container adapted to hold the foodstuff to be dispensed, a stationary supporting element for the container, power operated means for advancing the container along the stationary supporting element, means for discharging foodstuffs at a predetermined rate from the container at successive positions thereof along the supporting element, the arrangement being such that similar quantities of foodstuffs of similar quality, can be discharged to each of the several animals to be fed.

Preferably, the means for discharging the foodstuffs at a predetermined rate may comprise a power driven metering element having a plurality of food receiving compartments or pockets adapted successively to be advanced opposite the discharge orifice to the container, so as to effect measured discharge of the foodstuff therefrom, and the metering element would preferably be driven from the power means, for example, an electric motor, which serves also to drive the means for advancing the container along the supporting element.

Such container may be suspended from a rail disposed above the foodstuff receiving support, which may be constructed as a stationary shallow trough or as a platform.

The invention is illustrated in the accompanying drawings, wherein:

FIGURE 4 is a plan view of the container depicted in FIGURES 2 and 3,

FIGURE 6 is a view of part of the construction depicted in FIGURE 2, showing a slight modification, FIGURE 7 is a view similar to FIGURE 3, but showing this same modification.

Figure 1:
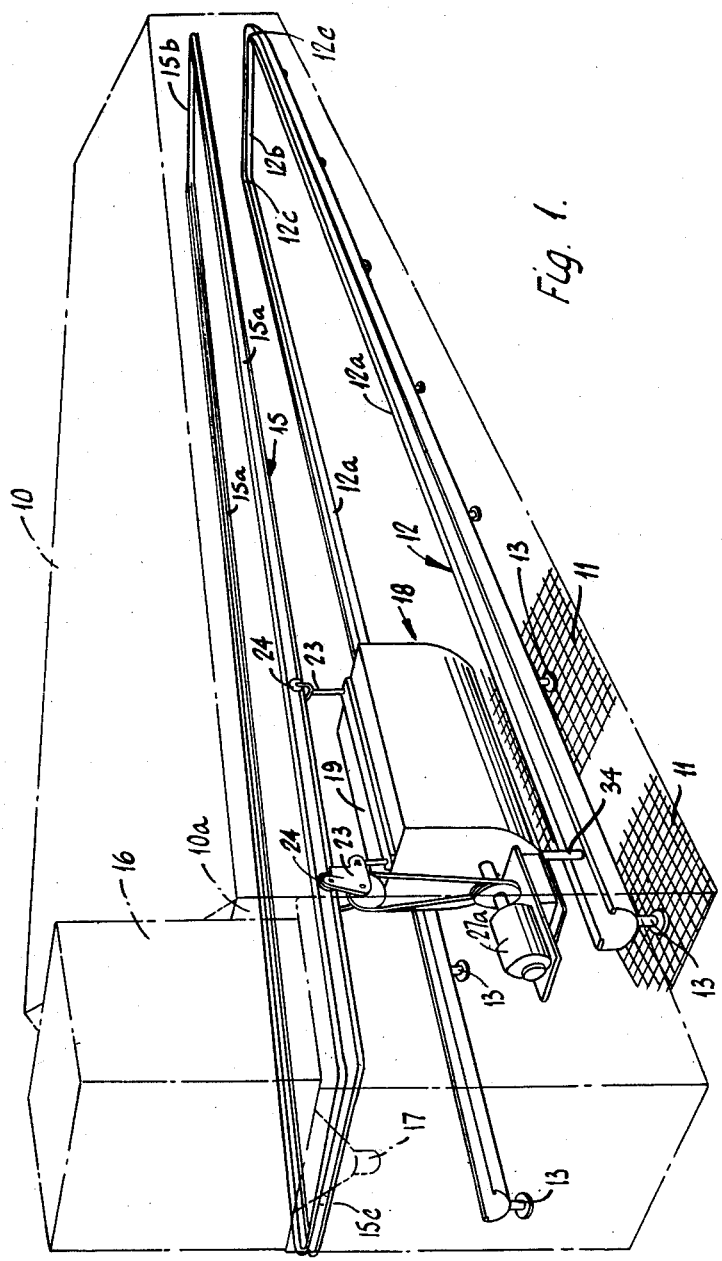
FIGURE 1 is a diagrammatic view depicting the application of the invention in a preferred form to the feeding of poultry.
Figure 2:
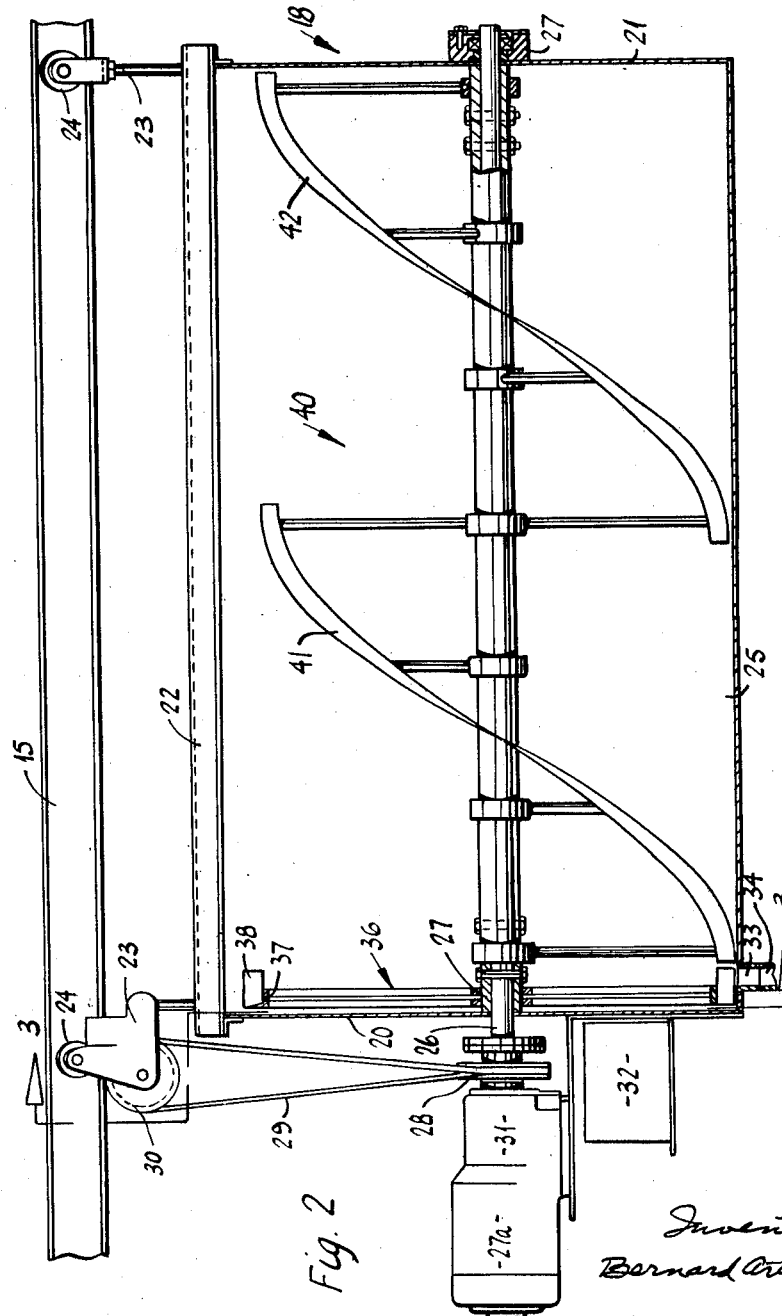
FIGURE 2 is a cross sectional view to an enlarged scale of the foodstuff container of the arrangement depicted in FIGURE 1.
Figure 3:
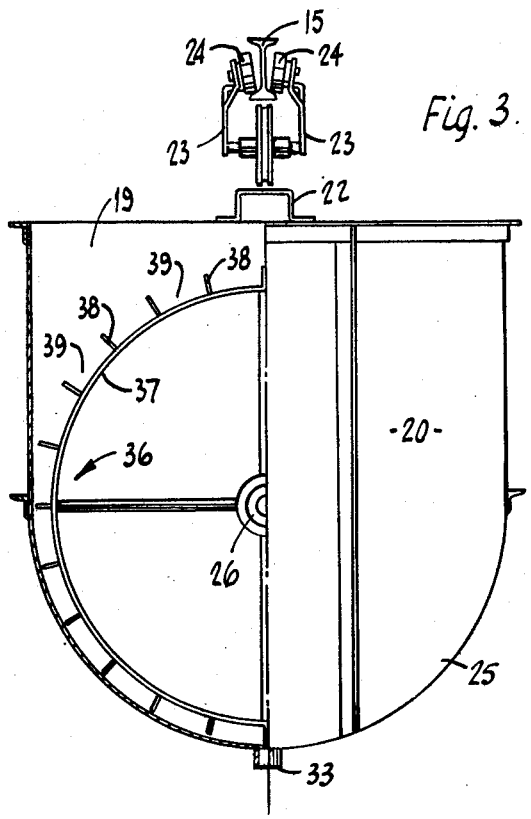
FIGURE 3 is a sectional view on the line 3—3 of FIGURE 2, only one half of the container being shown in section.

Referring firstly to FIGURE 1 of the drawings, the poultry house 10 there depicted, is what is commonly known as a broiler house embodying a wire mesh floor 11 immediately above which is supported a foodstuff receiving support 12 in the form of an open trough shaped to substantially elongated U configuration, so as to embody two horizontally spaced parallel side portions 12a, extending parallel to the length of the poultry house 10, and joined together at one end of the poultry house by an end portion 12b and connected to each of the side portions 12a by corner portions 12c of part circular configuration, conveniently having a radius of curvature of 3 ft.

Such foodstuff receiving trough is supported in a horizontal position immediately above the wire mesh floor 11 by vertically adjustable supporting means 13, whereby the height of the complete trough in relation to the floor 11 can be raised as the poultry grow in size.

Figure 5:
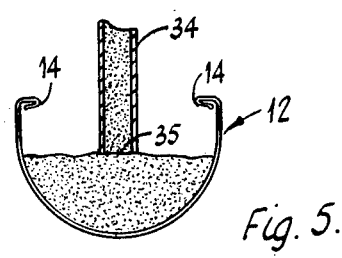
FIGURE 5 is a cross sectional view to an enlarged scale of the poultry feeding trough shown diagrammatically in FIGURE 1, depicting the manner in which the feedingstuffs is fed from the container into the trough itself.

The trough may be of substantially semi-circular configuration in cross section as shown in FIGURE 5 and provided with the usual anti-spillage lip 14 along each of its two upper edges.

Spaced vertically above the trough 12 is a container supporting rail 15 conveniently disposed at a distance of some 5 ft. above the trough 12, the rail being of endless configuration so as to embody two side portions 15a and one end portion 15b respectively disposed vertically above each of the two trough side portions 12a and end portion 12b, the aforementioned rail portions being all disposed in a common horizontal plane.

The two side portions 15a of the rail at the ends thereof furthest from the end portion 15b are extended through a pair of openings in the adjacent end wall 10a of the poultry house 10 and are joined outside the poultry house proper by a connecting portion 15c so as to form a complete loop or endless configuration to the rail 15. This rail portion 15c extends within a charging chamber 16 which permits of the container being refilled from a main supply hopper diagrammatically illustrated at 17 in FIGURE 1.

The rail 15, as shown, is of "I" section, and is adapted to support suspended therebeneath, a container 18 for the food stuff to be dispensed to the poultry, namely broiler dry mash, in the particular example described, such mash comprising mixture of a number of different ingredients compounded together in the known manner.

The container 18 is constructed as an elongated hopper of U configuration in cross section, and having an open mouth 19, with its two end walls 20, 21 joined together across the top of the mouth by a bracing bar 22 disposed above the central longitudinal axis of the container 18, opposite ends of the bar 22 being each connected to one of a pair of roller carrying brackets 23, the two rollers 24 on each bracket engaging with the bottom flange of the "I" section supporting rail.

Extending within the container between opposite ends 20, 21 thereof concentrically with the axis of curvature of the semi-circular base 25 to the container, is a spindle 26, the two ends of which are supported in bearings 27 provided in the end walls 20, 21 of the container, one end of the spindle projecting beyond the end wall 20 and being connected to an electric motor 27a supported from the container externally of this end thereof.

This projecting part of the spindle 26 also carries a driving pulley 28, having a belt drive 29 to a driven pulley 30 mounted on the adjacent suspension bracket 23 for rotation about an axis perpendicularly transverse to the length of the rail. Such pulley 28 is of V or grooved form, peripherally to receive the belt 29 within the pulley tread 30 which projects above the belt 29, to engage frictionally with the underside of the rail 15 to advance the container 18 therealong, and thus pulley 28 constitutes a driving wheel for driving the container 18 along the rail 15.

The electric motor 27a is provided with reduction gear drive of known form within casing 31 to spindle 26 so as to effect advancement of the container at a relatively slow speed, e.g. 10 ft. per minute, and is powered by battery 32 supported from the adjacent end wall 20 of the container 18 so as to advance therewith.

The base 25 of the container 18 at a position adjacent end wall 20, is provided on its underside, with a discharge orifice 33 which leads into the upper end of a verically dependant discharge tube 34, the lower end 35 of which as shown in FIGURE 5, extends partially within the feeding trough 12 so as to depend a short distance below the upper side or mouth of the trough at a position equidistantly between the two sides of the trough.

Where, as is preferred the trough has an overall depth of about 3½", the lower end 35 of the tube 34 would be spaced above the bottom of the trough by a distance of about 1½", and the arrangement is such that when the depth of foodstuff within the trough exceeds about 1½", by reason of the relatively small bore of the tube, including the discharge end thereof, which in practice would be about 1", further discharge of foodstuff into the trough is prevented so that there is no danger of the trough being filled right up to the mouth with consequent risk of wastage of foodstuff. By suitably varying the height of the lower end 35 of the discharge tube 34 in relation to the base of the trough, the depth of foodstuff within the trough may be adjusted as may be required.

Mounted on the spindle 26, adjacent end wall 20 of the container, is a metering element 36, in the form of a disc having a peripherally circular flange 37 provided with a number of equidistantly spaced parallel radially outwardly extending fins 38, which as shown in FIGURE 4, are disposed at an inclination to the axis of spindle 26, so as by rotation of element 36 to displace material between the fins in a direction along the length of the container 18 axially towards the discharge orifice 33. The fins projecting axially beyond one edge of the flange so as to work in alignment with the discharge orifice 33, which orifice is situated on that side of the metering element furthest from the adjacent end wall 20 of the container.

The disc is accordingly provided with a series of pockets or compartments 39, formed by the spaces between the fins 38 each adapted to contain the same predetermined quantity of the feeding mash.

Mounted on the spindle 26, intermediate the metering element and the other end wall 21 of the container, is a combined conveyor and agitating element 40, conveniently in the form of a helically shaped blade, or as shown, a pair of such blades 41, 42 supported at intervals along their length from the spindle, each blade 41 subtending substantially 180° in relation to the axis of the spindle, with the two blades spaced axially of the container and with the one end of one blade 41, 42 overlapping with but spaced angularly by 180° in relation to the adjacent end of the other blade 42.

In operation, when the electric motor 27a is driven it will be appreciated from the foregoing description that the container 18 will be advanced slowly and continuously along the length of the rail 15 and that simultaneously the spindle 26 carrying the metering element 36, together with the helical conveyor and agitating element 40, will be rotated in a direction having regard to the hand of the helix thereof, to advance the foodstuff along the length of the container towards the discharge orifice 33 thereof, the metering element 36 by its rotation presenting its pockets or compartments 39 successively to the orifice 33 so as to ensure that the material is discharged from the orifice at a controlled rate.

In practice the container 18 would be advanced at predetermined time intervals over the entire length of the foodstuff containing trough 12, the container during each such interval being advanced continuously along the entire length of the rail 15 which is above the trough 12, the container, prior to and subsequent to each such advancement thereof being disposed within a charging chamber 16 outside the poultry house proper, so as to be supported therefrom the rail section 15c. During this time, not only would the container 18 be recharged from the hopper 17, but the electric storage battery 32 would also be recharged.

In practice, the rest period during which the container is within the charging chamber 16, would be considerably longer than the time required for a single traverse of the rail sections 15a and 15b so that ample time is available for recharging the battery 32 as well as for refilling the container. If desired, the commencement and conclusion of each feeding cycle, as well as the commencement and conclusion of the charging operations for both the battery and also the container 18, may be controlled automatically e.g. by a suitable time switch and this would preferably be so arranged as to ensure that the container is filled with just sufficient mash as is required during each feeding cycle so that the container is just emptied as it leaves the poultry house and re-enters the charging chamber 16.

It will be understood that since the rail 15 is arranged in endless configuration, the container is always advanced in the same direction along the rail.

Instead of operating the electric motor 27a from a storage battery, it may be directly operated from the supply mains by mounting on the upper part of the rail 15 on each side thereof, as shown in FIGURE 7, a pair of conductor strips 43, each of which is engaged by a corresponding collector shoe 44, the two shoes of which one only is depicted in FIGURE 6, being each mounted on a spring loaded arm 47, supported from one of the container suspension brackets 23.

Although the invention has been described as applied to the dispensing of poultry food, it should be understood that it is applicable to the dispensing of foodstuffs for other animals, for example, in the rearing of young calves.

Irrespective of this particular application, it will be appreciated that by the present invention foodstuff of the same quality, in the sense of the predetermined composition, is deposited successively at different positions along the length of the foodstuffs receiving support, so that the foodstuff is supplied in a uniform manner to the several birds or other animals thereby ensuring as far as possible that they each receive the same amount of foodstuff and of the same quality, so as to provide for as uniform rate of growth, and the disadvantages of the existing mode of foodstuffs dispensing is, by the present invention, avoided, as will be apparent from the foregoing description.

What I claim then is:

1. Apparatus for dispensing animal food stuffs into a feeding trough, comprising in combination, a rail, a container for the food stuff to be dispensed supported on said rail for movement along the length thereof, a driving member in engagement with said rail for advancing said container along the length of said rail, said container having a base portion provided with a discharge outlet at one end thereof for delivering food stuff to said trough, a shaft extending between opposite ends of said container and supported therefrom for rotation, a metering element adjacent said discharge outlet mounted at one end of said shaft for rotation therewith, agitator and conveyor means mounted on said shaft for rotation therewith for conveying said food stuff toward said metering element, power means connected to said container, and drive transmitting means operably connecting said power means to said driving member and said shaft and adapted to simultaneously drive said driving member to advance said container along the length of said rail and to rotate said shaft to effect metered discharge of said food stuff from said container at a rate proportional to the rate of advancement of said container along said rail.

2. Apparatus for dispensing animal food stuff into a feeding trough, comprising in combination, a rail, a container for the food stuff to be dispensed supported on said rail for movement along the length thereof, a driving member in engagement with said rail for advancing said container along the length of said rail, said container having a base portion of part-circular configuration in cross-section and having a discharge outlet at one end of said base portion for delivering foodstuff to said trough, a shaft extending between opposite ends of said container and supported therefrom for rotation, a metering element having a plurality of pockets spaced around the periphery thereof mounted on one end of said shaft for rotation therewith to deliver metered quantities of foodstuff through said discharge outlet, combined agitator and conveyor means comprising a helical blade mounted on said shaft for rotation therewith, power means connected to said container, and drive transmitting means operably connecting said power means to said driving member and said shaft and adapted to simultaneously drive said driving member to advance said container along the length of said rail and to rotate said shaft in a direction such that the foodstuff is conveyed by said helical blade to said metering element.

3. Apparatus for dispensing animal foodstuff, comprising in combination, a feeding trough, a rail of endless configuration disposed above said trough, a container for the foodstuff to be dispensed supported on said rail for movement along the length thereof, a driving member in engagement with said rail for advancing said container along the length of said rail, said container having a base portion of part-circular configuration in cross-section and having a discharge outlet at one end of said base portion extending within said trough a predetermined amount such that the discharge of foodstuff is prevented when said trough contains a required amount of said foodstuff, a shaft extending between opposite ends of said container and supported therefrom for rotation, a metering element having a plurality of pockets spaced around the periphery thereof mounted on one end of said shaft for rotation therewith to deliver foodstuff through said discharge outlet, combined agitator and conveyor means comprising a helical blade mounted on said shaft for rotation therewith, power means connected to said container, and drive transmitting means operably connecting said power means to said driving member and said shaft and adapted to simultaneously drive said driving member to advance said container along the length of said rail and to rotate said shaft in a direction such that the foodstuff is conveyed by said helical blade towards the said metering element.

4. Apparatus for dispensing animal foodstuff comprising in combination, a feeding trough, a charging compartment, a rail of endless configuration passing through said charging compartment and disposed above said trough, a container for the foodstuff to be dispensed supported on said rail for movement along the length thereof, a driving member in engagement with said rail for advancing said container along the length of said rail, said container having an open top and a base portion of part-circular configuration in cross-section and having a discharge outlet at one end of said base portion extending within said trough a predetermined amount such that the discharge of food is prevented when the container contains a required amount of said foodstuff, a shaft extending between opposite ends of said container and supported therefrom for rotation, a metering element having a plurality of pockets spaced around the periphery thereof mounted on one end of said shaft for rotation therewith to deliver food stuff through said discharge outlet, combined agitator and conveyor means comprising a helical blade mounted on said shaft for rotation therewith, an electric motor carried by said container, an electric battery carried by said container to power said electric motor, said electric motor being adapted to simultaneously drive said driving member to advance said container along the length of said rail and to rotate said shaft in a direction such that the food stuff is fed by said helical blade towards said metering element.

References Cited in the file of this patent

UNITED STATES PATENTS

| | | |
|---|---|---|
| 2,521,398 | North | Sept. 5, 1950 |
| 2,601,057 | Roberts et al. | June 17, 1952 |
| 2,685,863 | Martin | Aug. 10, 1954 |
| 2,786,448 | McMaster | Mar. 26, 1957 |
| 2,791,200 | Palmer | May 7, 1957 |
| 2,797,663 | Bailey | July 2, 1957 |